United States Patent

[11] 3,554,102

| [72] | Inventor | Herbert Maronde |
| | | Duesseldorf, Germany |
| [21] | Appl. No. | 743,819 |
| [22] | Filed | July 10, 1968 |
| [45] | Patented | Jan. 12, 1971 |
| [73] | Assignee | Robot Foto und Electronic G.m.b.H. & Co., KG. |
| | | Dusseldorf, Germany |
| [32] | Priority | July 18, 1967 |
| [33] | | Germany |
| [31] | | No. 1,597,380 |

[54] PHOTOGRAPHIC MONITORING DEVICE
12 Claims, 2 Drawing Figs.

[52] U.S. Cl. .................................................. 95/1.1,
95/31, 95/53
[51] Int. Cl. ....................................................... G03b 9/62,
G03b 17/24, G03b 17/36
[50] Field of Search........................................... 95/1.1, 36;
250/67; 352/90

[56] References Cited
UNITED STATES PATENTS

| 2,821,124 | 1/1958 | Enright.......................... | 95/1.1 |
| 2,987,976 | 6/1961 | Martin........................... | 95/1.1 |
| 3,452,196 | 6/1969 | Gray.............................. | 250/67 |

*Primary Examiner*—John M. Horan
*Assistant Examiner*—M. L. Gellner
*Attorney*—Darbo, Robertson and Vandenburgh ABSTRACT: A camera has an instantaneously operating main shutter operated by the actuation of an electromagnetic tripping device and an auxiliary shutter held open so long as the device is actuated. An exposure relay operates the device and a release relay operates the exposure relay for a period of time determined by an adjustable resistance-capacitor means. The release relay also increases the illumination provided by an auxiliary light source. A counter is controlled by a switch on the main shutter and disables the release relay after a given number of actuations of the main shutter except when a magazine is inserted in the camera.

PATENTED JAN 12 1971

3,554,102

INVENTOR:

HERBERT MARONDE

BY
Darbo, Robertson &
Vandenburgh Attys.

3,554,102

PHOTOGRAPHIC MONITORING DEVICE

BACKGROUND OF THE INVENTION

The present invention relates to a photographic monitoring device including a camera having automatic film advance and automatically setable main shutter, adapted to photograph the monitored object. With monitoring devices of the type indicated it is known to simultaneously photograph a secondary image formed by an indicating instrument reflected into the image field by means of an auxiliary objective and an auxiliary shutter releasable with the main shutter. The indicating instrument is illuminated by an auxiliary light source. By the secondary image, measured data related to the action to be monitored as well as time and date are recorded. Thereby documentary proof of the action can be established. As it is generally necessary to release such exposures of pictures to be monitored automatically or by remote control, it is known to provide an electromagnetic tripping device for the shutters.

It is the object of the present invention to design a monitoring device of the type indicated in a manner such that if may be operated in foolproof manner; that, in particular, the exposure time of the secondary image is adjustable and independent of the duration of the release contact; that a trigger lock becomes effective together with an exposure counter as soon as a predetermined number of exposures has been obtained; and that safety for an unobjectionable course of action and a monitoring thereof are possible. To achieve this, a relatively complicated electric control of the monitoring device is necessary.

According to the invention, the essential feature of this control device resides in the fact, that common tripping magnet serves to release the main shutter, adapted to instantaneous exposure, and the auxiliary shutter, adapted to time exposure, said magnet being excitable via an exposure relay by means of an adjustable RC-element. Whereas hitherto the electric circuit of the tripping magnet was closed directly by a release contact, according to the invention the excitation of the tripping magnet is effected indirectly via an exposure relay having an adjustable breaking delay corresponding to the time exposure. Expediently, switching on of the exposure relay is effected indirectly by a manually operated release contact via a release relay operating with a break contact and a make contact, via the break contact of which the capacitor of the RC-element is charged, and via the make contact of which the exposure relay is connected to the capacitor.

With such a relay control it becomes possible to connect counting contacts of an exposure counter controlled by a contact of the main shutter, between the release contact and the release relay and to interrupt the electric circuit of the release relay by the counting contacts at a presetable number of exposures in order to achieve an automatic trigger lock. The number of exposures so preset is dependent on the length of the film normally used in the camera. A normal film spool, for instance, permits 38 exposures. However, with monitoring devices of the type indicated, it is possible to attach a magazine to the camera in well-known manner, with the magazine being capable of accommodating a substantially greater length of film of, for instance 98.4 or 196.8 feet. In such case, the trigger lock would become active in undesirable manner after 38 exposures. Provision therefore is made for the counting contacts to be bridged by a switch which, when a film magazine is attached to the camera, is actuated to disable the counter.

Advantageously, the auxiliary light source for illuminating the instrument also is connected to the release relay. Provision may be made that the auxiliary light source is in series connection with a signal lamp constantly burning with a partial voltage. Then, the signal lamp visible from without will light up to a greater extent each time the auxiliary light source is connected through the release relay, whereby it is recognizable from without that the release relay has operated.

Furthermore, provision may be made that an adjustable RC-element is selectively connectable by a switch in parallel relationship to the release relay. When the RC-element is switched on, a reexcitation of the tripping magnet is possible only after a specific period of time depending on the time constant of the RC-element. In this manner, a second release of the monitoring device may be prevented before, for instance, a coupled electronic flash unit has been recharged and is again ready for exposure. Therefore, with the coupling of an electronic flash unit, has been the said connection of the RC-element may be combined automatically. Also for other reasons, it may be desirable to provide a delayed reconnection of the release relay, as for instance with a radar-controlled traffic monitoring.

SUMMARY OF THE INVENTION

The present invention relates to a simple and effective control apparatus for the shutters and auxiliary illumination of a monitoring camera.

DESCRIPTION OF THE SPECIFIC EMBODIMENT

Figure 2:
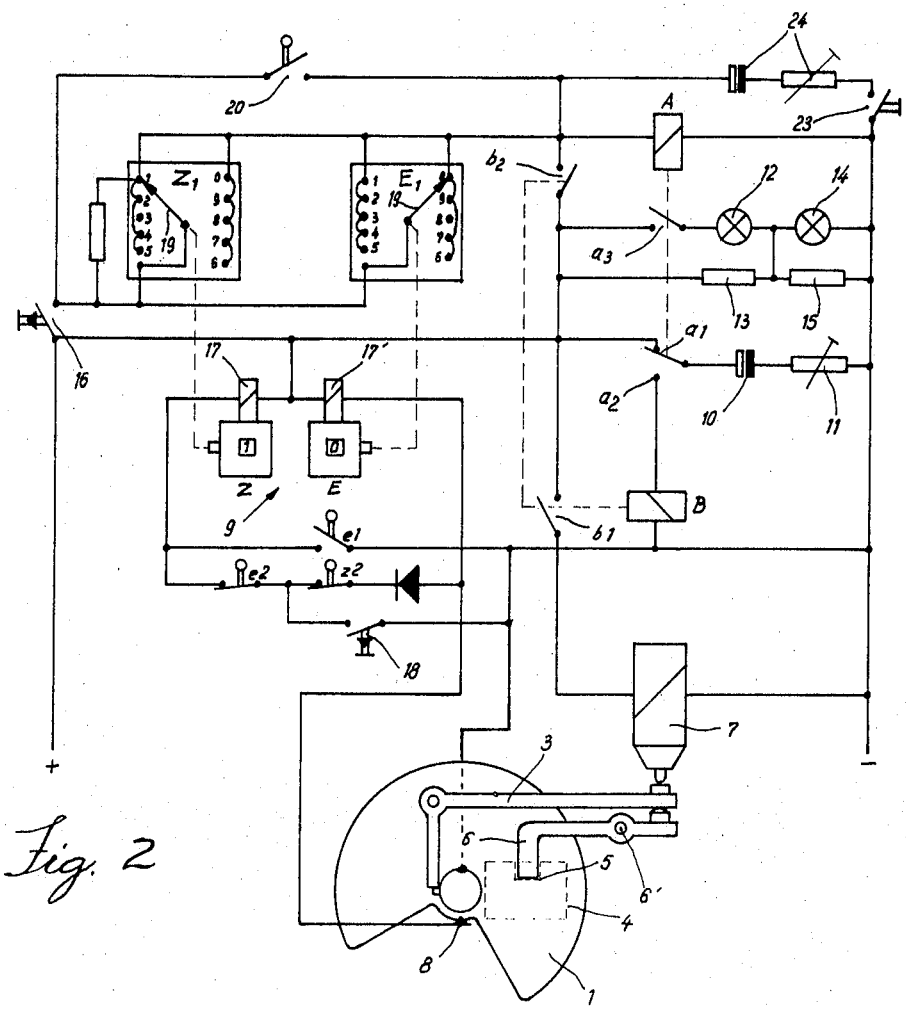
FIG. 2 is a schematic illustration of the control apparatus as associated with the camera shutters.
Figure 1:
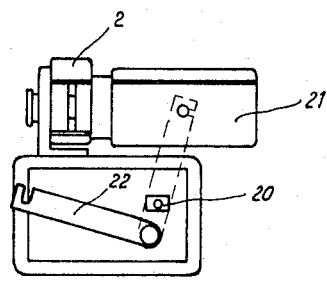
FIG. 1 is an elevational view of a camera embodying the invention.

Reference numeral 1 designates the main shutter of a photographic camera 2, designed as rotor disc After release of a stop lever 3 the rotor disc 1 executes one full revolution whereby an instantaneous exposure of the image field 4 takes place. In a manner not illustrated, the secondary image 5 of an indicating instrument exposed to light by an auxiliary shutter 6 is reflected into the image field 4 of the camera 2. A The auxiliary shutter 6 comprises a stop pivoted as at 6'. A common tripping magnet 7 is provided for the simultaneous release of the stop lever 3 and for pivoting of the auxiliary shutter 6.

In conventional manner, the main shutter 1 includes a contact 8 activated during shutter operation and normally used for the release of a flash light. In the present instance the contact 8 controls an exposure counter 9 known per se. The tripping magnet 7 is switched on and off by the make contact $b_1$ of an exposure relay B. For switching on the exposure relay B a release relay A is used. Release relay A has a break contact $a_1$ and a make contact $a_2$. Via the break contact $a_1$, a capacitor 10 has a voltage applied thereto through an adjustable resistor 11. The voltage is supplied from a source of electricity represented by the wires marked + and −.

Together with the resistor 11 the capacitor 10 constitutes an RC-element, the time constant of which is adjustable by the resistor 11. When the release relay A responds as a result of the operation of switch 16, the break contact $a_1$ will be released and the make contact $a_2$ closed, whereby the charged RC-element 10, 11 will be connected to the exposure relay B. This energizes the exposure relay for a relatively short period of time dependent on the adjustment of the RC-element. The exposure relay switches on the tripping magnet 7 for this period of time via the make contact $b_1$. Thus, the exposure duration of the auxiliary shutter 6 is dependent on the adjustable time constant of the RC-element 10, 11.

The release relay A includes a second make contact $a_3$ whereby a glow lamp 12 may be switched on, used to illuminate the instrument to be photographed as secondary image 5. The glow lamp 12 is in parallel connection with a resistor 13 via which a signal lamp 14 is energized, in series connection with the glow lamp 12 and visible from without. A resistor 15 is connected in parallel with the signal lamp 14. The signal lamp 14 is constantly burning with a voltage reduced by the resistor combination 13, 15. However, as soon as the make contact $a_3$ is closed and the glow lamp 12 switched on (upon excitation of the tripping magnet A) the signal lamp 14 will light up brightly, as the resistor 13 is bridged. Thus, this lighting up of the signal lamp 14 may serve to recognize the response of the release relay A from without.

Switching on of the release relay A is effected by a release contact or switch 16 to be actuated manually or by a time clock (not shown) or the like, through the counting contacts $E_1$, $Z_2$. As soon as the release relay A has responded and the exposure relay B has been temporarily excited, in the manner as described hereinbefore, the release contact 16 is bridged by contact $b_2$ during the exposure duration so that contact 16 may be opened prematurely, without the release relay A going off during the exposure duration.

The exposure counter 9 comprises two counting devices which may be stepped on by stepping actuators 17, 17'. There is a units counter E and a tens counter Z which are stepped forward from unit to unit in known manner via relay contacts $e_1$, $e_2$, $z_2$, as soon as a switch pulse is supplied by the shutter contact 8. By a key 18 to be actuated manually, bridging the shutter contact 8, the exposure counter 9 may be connected to the source of power and thereby reset to zero.

Each of the counting devices E, Z includes a counting contact arrangement $E_1$ and $Z_1$, respectively, each having one contactor 19, 19' rotating with the counter shaft. The contactors 19, 19' rotating are connected in parallel to each other. Successively, they contact 10 counting contacts each referenced 1—0. The 10 counting contacts of $E_1$ are in series connection, as are the 10 counting contacts of $Z_1$. The series connection of $E_1$ is parallel to the series connection of $Z_1$ in the electric circuit of the release relay A.

Now, a presetting of the exposure counter 9 may be accomplished in that one counting contact of each of the $Z_2$ series and of the $E_1$ series is isolated from the other counting contacts. In the $Z_2$ series the counting contact that is isolated is number 3 (corresponding to an exposure number 30) and in the $E_1$ series the counting contact is number 8. Thus, the exposure counter 9 is preset to an exposure number of 38. This means that the electric circuit between the release contact 16 and the release relay A is interrupted as soon as the two contactors 19, 19' have reached the isolated counting contacts. Thus, in the present case, closing of the releasing contact 16 after an exposure number of 38 has been reached, remains without any effect on the release relay A.

Now, this presetting or trigger lock may be rendered ineffective in that the counting contact device $E_1$ $Z_1$ is bridged by a switch 20. This switch 20 is closed automatically, as soon as a film magazine 21 is attached to the photographic camera 2 and said magazine is locked by means of a locking lever 22. As the magazine 21 in contrast to a normal roll film spool contains 98.4 or even 196.8 feet of film, a trigger lock after 38 exposures is not desired.

By a switch 23 an RC-element 24 may be switched on in parallel to the release relay A, whereby the release relay A remains excited for a specific period of time so that during that period of time (dependent on the time constant of the RC-element 24) there will be no renewed release. This delay in a renewed release is, for instance, required when coupling an electronic flash unit, as the same needs a certain period of time for recharging before it is ready for another exposure. Thus, the switch 23 may be closed automatically, when, for instance, an electronic flash unit is coupled or when a radar-controlled indicating instrument is connected as secondary image. Thereby, only one single vehicle passing by is monitored, and there is no actuation of the monitoring device by other vehicles following at short intervals.

I claim:

1. In a photographic-monitoring apparatus for use with and including a camera having an automatic film advance and an automatically setable main shutter means adapted to photograph the mentioned object and auxiliary shutter means releasably with the main shutter means to simultaneously photograph a secondary image reflected into the image field of subject matter and an electromagnetic-tripping device for actuating both of the shutters, the improvement comprising:

said main shutter means when actuated by said device providing an instantaneous exposure;

said auxiliary shutter means when actuated by said device providing a time exposure commensurate with the time of actuation of said device;

an exposure relay connected to said device for energizing said device for therethrough; and control means connected to said relay to determine the length of time that said device is energized through the relay.

2. In an apparatus as set forth in claim 1, wherein said control means includes an adjustable resistance-capacitor device.

3. In an apparatus as set forth in claim 2, wherein said control means includes a release relay having a break contact which is opened and a make contact which is closed when the release relay is actuated; said resistance-capacitor device being connected to said source through said break contact for charging; said exposure relay being connected to said resistance-capacitor device through said make contact for energizing the exposure relay from said resistance-capacitor device to actuate said tripping device so long as said exposure relay is energized; a manually operable switch; and circuit means connecting said switch and said release relay to said source to actuate said release relay in response to the manual operation of said switch.

4. In an apparatus as set forth in claim 3, including a shutter switch operably connected to the main shutter to be actuated each time the main shutter is actuated, and wherein said circuit means includes an exposure counter having counting contacts and means connecting said manual switch and said release relay through said counting contacts to form an electrical circuit therethrough except at a predetermined count at which time said circuit is open, said counter being connected to said source through said shutter switch to actuate the counter each time that the shutter switch is actuated by the main shutter.

5. In an apparatus as set forth in claim 4 for use with a camera having an attachable film magazine, and including a bridging switch connected in parallel with said counting contacts, said bridging switch being positioned to be closed when said magazine is attached to said camera to thereby render the counter ineffective at said predetermined count and to permit the actuation of the release relay.

6. In an apparatus as set forth in claim 5 for use with an auxiliary light to illuminate said subject matter, and wherein said release relay has a second make contact, said auxiliary light being connected to said source through said second make contact to energize said light when said release relay is actuated.

7. In an apparatus as set forth in claim 6, including resistance means connecting said auxiliary light to said source to cause said light to be turned on to a lesser extent when said release relay is not actuated.

8. In an apparatus as set forth in claim 7, including a second adjustable resistance-capacitor device, another switch and means connecting said other switch and said second resistance-capacitor device in parallel with said release relay to maintain the energization of the release relay for a period of time.

9. In an apparatus as set forth in claim 3 for use with an auxiliary light to illuminate said subject matter, and wherein said release relay has a second make contact, said auxiliary light being connected to said source through said second make contact to energize said light when said release relay is actuated.

10 In an apparatus as set forth in claim 9, including a signal lamp, and means connecting said signal lamp to said source through said auxiliary light whereby said signal lamp glows relatively bright when said release relay is actuated, the last-mentioned means connecting said signal lamp to cause said lamp to be turned on to a lesser extent when said release relay is not actuated.

11. In apparatus as set forth in claim 10, including a second adjustable resistance-capacitor device, another switch and means connecting said other switch and said second resistance-capacitor device in parallel with said release relay to maintain the energization of the release relay for a period of time.

12. In an apparatus as set forth in claim 3, including a second adjustable resistance-capacitor device, another switch and means connecting said other switch and said second resistance-capacitor device in parallel with said release relay to maintain the energization of the release relay for a period of time.